(12) United States Patent
Rong et al.

(10) Patent No.: US 8,204,851 B2
(45) Date of Patent: Jun. 19, 2012

(54) METHOD AND SYSTEM FOR PROVIDING A GRAPHICAL WORKFLOW MONITOR

(75) Inventors: Ruowen Rong, Holliston, MA (US);
Lingrong Chen, Shrewsbury, MA (US);
Gang Fu, Shrewsbury, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 312 days.

(21) Appl. No.: 11/695,412

(22) Filed: Apr. 2, 2007

(65) Prior Publication Data
US 2008/0243902 A1 Oct. 2, 2008

(51) Int. Cl.
*G06F 17/30* (2006.01)

(52) U.S. Cl. ........ 707/608; 707/672; 707/705; 707/792; 707/805; 707/802

(58) Field of Classification Search .................. 707/608, 707/672, 705, 792, 805, 802
See application file for complete search history.

(56) References Cited

U.S. PATENT DOCUMENTS

| | | | | |
|---|---|---|---|---|
| 5,799,297 A | * | 8/1998 | Goodridge et al. ................... 1/1 |
| 5,870,545 A | * | 2/1999 | Davis et al. ................... 709/201 |
| 6,038,538 A | * | 3/2000 | Agrawal et al. ................... 705/7 |
| 7,143,100 B2 | * | 11/2006 | Carlson et al. ................ 707/101 |
| 7,272,616 B1 | * | 9/2007 | McKinnon ............................ 1/1 |
| 7,657,475 B1 | * | 2/2010 | Arpin et al. ..................... 705/35 |
| 7,761,851 B2 | * | 7/2010 | Bailey et al. ................... 717/121 |
| 2002/0055849 A1 | * | 5/2002 | Georgakopoulos et al. ...... 705/1 |
| 2004/0015369 A1 | * | 1/2004 | Kim et al. .......................... 705/1 |
| 2005/0120298 A1 | * | 6/2005 | Petrujkic ....................... 715/511 |
| 2005/0131750 A1 | * | 6/2005 | Kogan et al. ...................... 705/9 |
| 2005/0154741 A1 | * | 7/2005 | Hebert et al. ................. 707/100 |
| 2006/0031746 A1 | * | 2/2006 | Toepfer et al. ................ 715/500 |
| 2006/0069596 A1 | * | 3/2006 | Hatoun et al. .................... 705/7 |
| 2006/0143034 A1 | * | 6/2006 | Rothermel et al. ............... 705/1 |
| 2007/0006122 A1 | * | 1/2007 | Bailey et al. ................... 717/101 |
| 2007/0013948 A1 | * | 1/2007 | Bevan .......................... 358/1.15 |
| 2007/0038496 A1 | * | 2/2007 | Parvatikar et al. ............... 705/8 |
| 2007/0048696 A1 | * | 3/2007 | Blank ............................ 434/156 |
| 2007/0067373 A1 | * | 3/2007 | Higgins et al. ................ 707/206 |

OTHER PUBLICATIONS

Leymann and Altenhuber, Managing business processes as an information resource, IBM Systems Journal, vol. 33, No. 2, 1994.*

* cited by examiner

*Primary Examiner* — Frantz Coby (57) ABSTRACT

A browser based workflow monitor uses a graphical user interface (GUI) to display workflow status information and to create log information. The monitor presents the log information to a user in a format that is easily understood. Workflow information is accessed from a user workstation via a data network and displayed within a browser application.

14 Claims, 12 Drawing Sheets

Workflow Instance History — 1101

| Name | Type | Start Time | End Time | Message |
|---|---|---|---|---|
| Order Preprocessing | Task | 2006-04-18 06:02:49 | 2006-04-18 06:02:50 | |
| Order Preprocessing | Action | 2006-04-18 06:02:49 | 2006-04-18 06:02:50 | |
| Data Gathering Validation | Task | 2006-04-18 06:02:51 | 2006-04-18 06:02:52 | |
| Data Gathering Validation | Action | 2006-04-18 06:02:51 | 2006-04-18 06:02:52 | |
| Set Order Status To Pending | Action | 2006-04-18 06:02:52 | 2006-04-18 06:02:52 | |
| Terminate Pricing Plan | Task | 2006-04-18 06:02:53 | 2006-04-18 06:05:03 | |
| Send Terminate Pricing Plan Request | Action | 2006-04-18 06:03:02 | 2006-04-18 06:03:02 | |
| Event | Event | 2006-04-18 06:03:02 | 2006-04-18 06:04:06 | Task Terminate Pricing Plan starts to wait on ev.. [ManagePricingPlan]! |
| Process Terminate Pricing Plan Response IVCBillingC | Action | 2006-04-18 06:04:07 | 2006-04-18 06:04:08 | Task Terminate Pricing Plan in instance=206913 user's manual input! |
| Manual Input Task | Manual Input Task | 2006-04-18 06:04:10 | 2006-04-18 06:05:01 | |
| Stop Billing | Task | 2006-04-18 06:05:03 | 2006-04-18 06:07:11 | |
| Send Stop Billing Request | Action | 2006-04-18 06:05:03 | 2006-04-18 06:05:06 | |
| Event | Event | 2006-04-18 06:05:06 | 2006-04-18 06:07:08 | Task Stop Billing starts to wait on event [Billing] |
| Process Stop Billing Response | Action | 2006-04-18 06:07:09 | 2006-04-18 06:07:11 | |
| Order Completion | Task | 2006-04-18 06:07:12 | 2006-04-18 06:07:14 | |
| Manage IVC Subscription | Action | 2006-04-18 06:07:12 | 2006-04-18 06:07:13 | |
| Set Order Status to Complete | Action | 2006-04-18 06:07:13 | 2006-04-18 06:07:14 | |

FIG. 12

METHOD AND SYSTEM FOR PROVIDING A GRAPHICAL WORKFLOW MONITOR

BACKGROUND INFORMATION

Automation of organizational activities poses a tremendous challenge in that routine tasks associated with a particular service or product involve complex interactions between technology resources and human resources. Although communications technologies have assisted with increasing productivity, such technologies, traditionally, have been deployed in an ad hoc manner, resulting in inefficiencies with respect to resource utilization. Therefore, workflow management systems have been deployed; however, these systems constitute a significant investment above other infrastructure costs.

There is presently no simple, cost-effective way for a user to determine the precise point in a multi-step workflow process. Traditionally, workflow management tools require users to parse through workflow status logs in order to determine the process history and the current status of the workflow. To address this, users can install client software on their desktops; unfortunately, these software packages are vendor-specific and implementation-dependent. Furthermore, different workflow management products require installation of different software packages to view a particular workflow process.

Based on the foregoing, there is a clear need for approaches that enable a user to quickly and efficiently access information about a workflow process, avoiding manually intensive tasks and reliance on vendor-specific/implementation-dependent software packages.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIG. 11 is a graphical screen showing workflow instance history, according to an exemplary embodiment.

DESCRIPTION OF PREFERRED EMBODIMENTS

An apparatus, method, and software for providing workflow monitoring are described. In the following description, for the purposes of explanation, numerous specific details are set forth in order to provide a thorough understanding of the various exemplary embodiments. It is apparent, however, to one skilled in the art that the various exemplary embodiments may be practiced without these specific details or with an equivalent arrangement. In other instances, well-known structures and devices are shown in block diagram form in order to avoid unnecessarily obscuring the exemplary embodiments.

Although the various exemplary embodiments are described with respect to browser application, it is contemplated that these embodiments have applicability to any graphical user interface (GUI).

Figure 1:
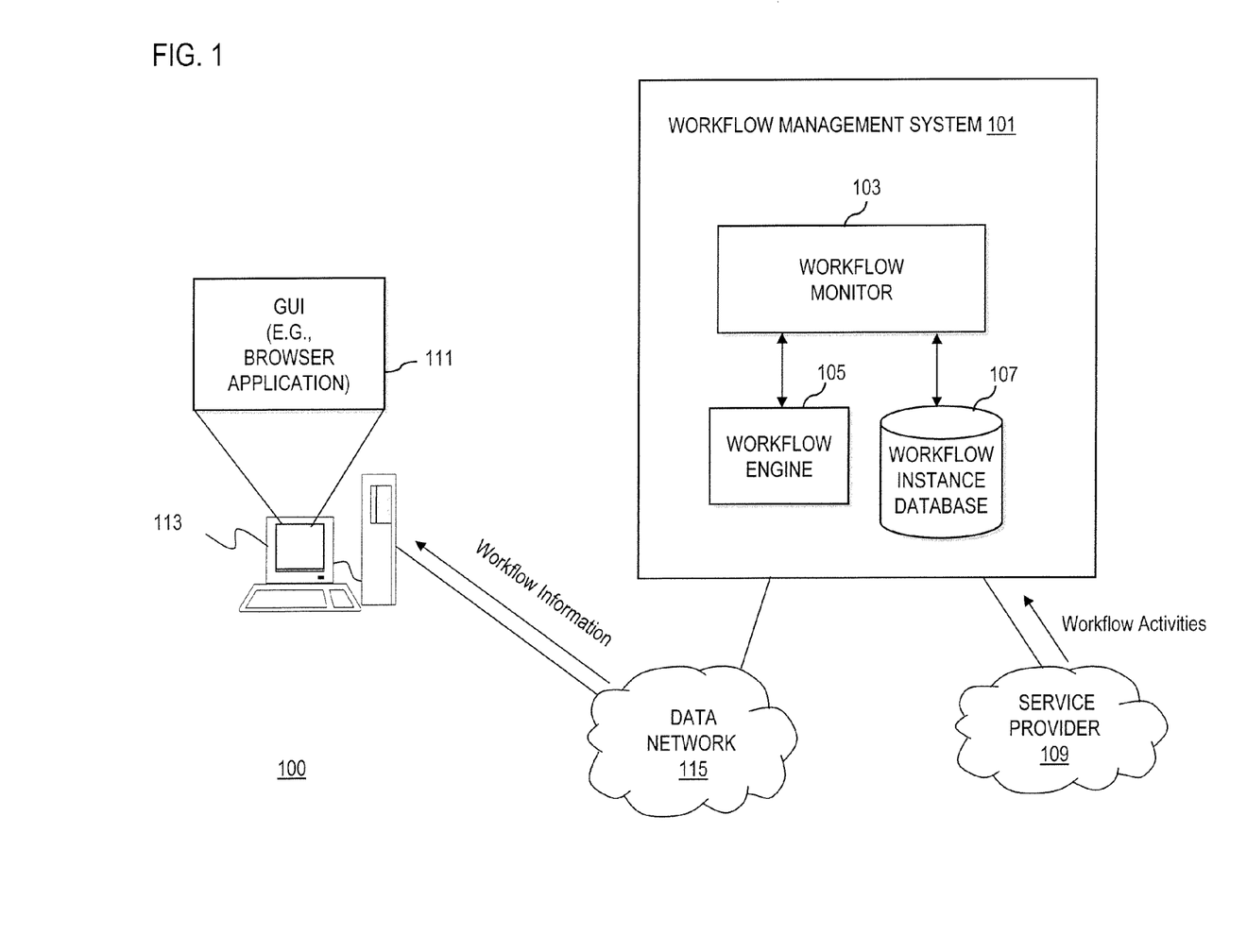
FIG. 1 is a diagram of a workflow processing system, according to an exemplary embodiment.

FIG. 1 is a diagram of a workflow processing system, according to an exemplary embodiment. A communication system 100 provides workflow monitoring via a graphical user interface (GUI) that employs standardized protocols, e.g., HyperText Transfer Protocol (HTTP), and computing languages, such as eXtensible Mark-up Language (XML). Accordingly, for the purposes of illustration, the workflow monitoring can be performed using a browser application. As shown, a workflow management system 101 includes a workflow monitor 103 that interfaces with a workflow engine 105. The workflow management system 101 can define, create, and manage the execution of workflow through the use of software, running on one or more workflow engines 105, which are able to interpret the process definition, interact with workflow participants and, where required, invoke the use of information technology (IT) tools and applications. In an exemplary embodiment, the workflow monitor 103 can be generic in that it does not depend on workflow management products of any particular vendors and can be employed in any software system that has workflow functionalities, such as order entry and provisioning systems. The workflow monitor 103 also communicates with a workflow instance database 107.

The workflow engine 105, in one embodiment, manages and executes modeled business processes. In addition, the workflow engine 105 may interpret the process definitions, and interact with workflow participants. In this example, workflows and associated activities are related to the service provider 109. A workflow relates to executing one task following another in accordance with specific business rules and conditions. Such workflow activities are processed by the workflow management system 101. The workflow engine 105 logs, for example, status information associated with the workflows; this process is more fully explained below. The resultant information from the analysis accessible by a browser application 111 (e.g. Microsoft Internet Explorer™, or Netscape™, etc.), which is resident on a computing device 113. In this instance, the computing device 113 is a desktop personal computer; however, it is contemplated that the device 113 can include any device capable of supporting a browser application—e.g., Personal Digital Assistant (PDA), web appliance, cellular phone, laptop, etc. The device 113 communicates with the workflow management system 101 via a data network 115; this network 115 can include a public data network, such as the global Internet, as well as a private intranet. For example, a flow diagram, indicative of workflow history and/or current status of the workflow associated with the activities of the service provider 109, can be displayed by the browser 111.

Figure 2:
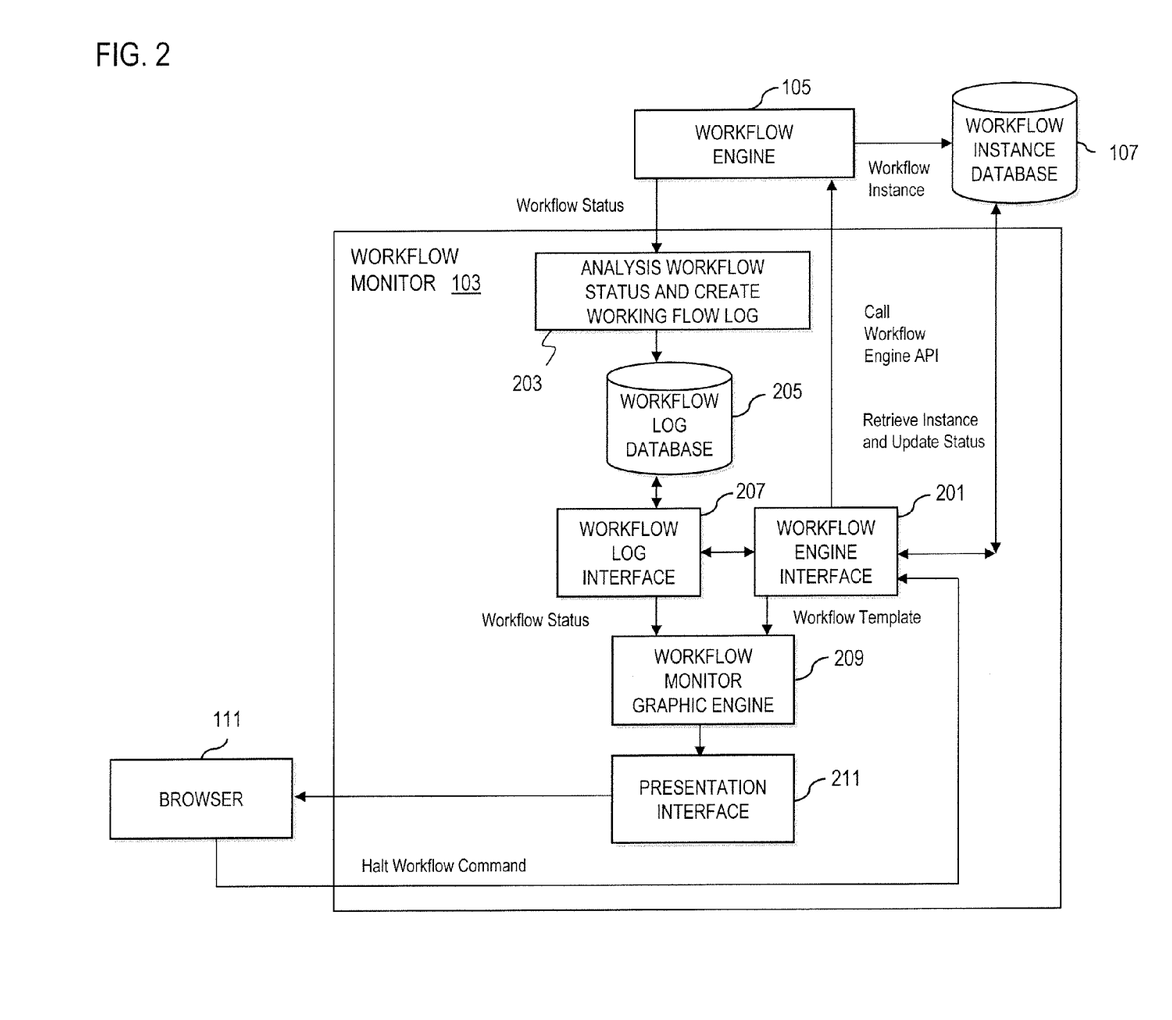
FIG. 2 is a diagram of a workflow monitor utilized in the system of FIG. 1.

FIG. 2 is a diagram of a workflow monitor utilized in the system of FIG. 1. The workflow monitor 103 includes a workflow engine interface 201, which provides an interface to the workflow engine 105 and the workflow instance database 107. The workflow monitor 103, through this interface 201, can retrieve an instance of a workflow to update status information for the workflow. The monitor 103 also can invoke calls to the application programming interface (API) of the workflow engine 105.

As seen, the workflow engine 105 provides workflow status information to the workflow monitor 103. An analysis module 203 receives such status information and creates a workflow log. The created workflow log is stored in a workflow log database 205 within the workflow monitor 103. Alternatively, the workflow log database 205 can be external to the workflow monitor 103. A workflow log interface 207 permits access to the workflow log database 205. The workflow log interface 207 also enables communication among the workflow engine 105 and the workflow instance database 107 via the workflow engine interface 201.

The workflow log database 205 passes the retrieved data, indicative of workflow status, along to a workflow monitor graphic engine 209. The workflow monitor graphic engine 209, receives, in addition to the workflow status from the workflow log interface 207, a workflow template from the workflow engine interface 201. The workflow status provides data indicative of the status of the workflow, while the workflow template provides formatting information—i.e., in the form of tables and/or diagrams—to be used in displaying the workflow information. For example, the template can organize a detailed workflow process history by way of a tree-table (hierarchy) data structure and graphic presentation. In addition, the template can specify displaying the current running status of all tasks within a workflow via tables and diagrams.

A presentation interface 211 outputs the workflow information to the browser 111. In this manner, the flow diagrams and/or tables may be displayed to the user, without requiring installation of any graphic display software packages at the user's computing device.

Additionally, if the workflow pauses for whatever reason (as, for example, manual work is needed, or an error condition has occurred, or the system is waiting for an external system to respond before proceeding, etc.), the workflow monitor 103 allows the user to view the current status and to manually intervene and perform tasks from the workflow monitor without the need to go through a conventional workflow task assignment user interface or to wait for a backend system to return in order to resume workflow based on the specific business requirement. This capability provides a substantial improvement over conventional systems, when dealing with flow recovery in a production environment.

Figure 3:
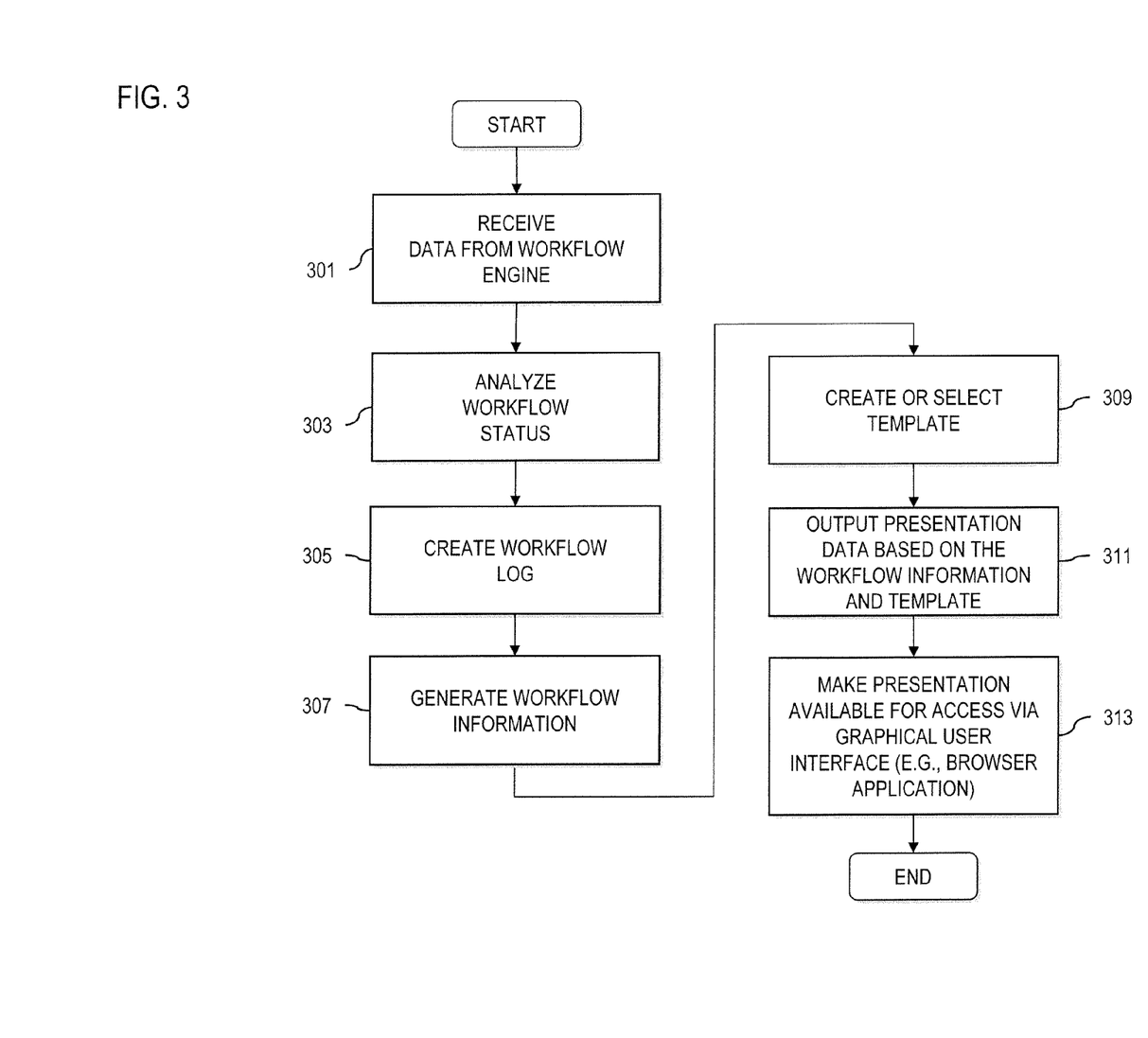
FIG. 3 is a diagram of a workflow process for providing a graphical interface, in accordance with an exemplary embodiment.

The operation of the workflow monitor 103 is further detailed in FIG. 3.

FIG. 3 is a diagram of a workflow process for providing a graphical interface, in accordance with an exemplary embodiment. In step 301, data, indicative of a workflow process, is received from the workflow engine 105. For example, this data can be related to status information relating to an activity within the workflow. Such data is analyzed, per step 303. A workflow log is then created, at step 305, and stored in the workflow log database 205. The workflow log database 205 can maintain a record of the history and current status of the workflow.

In step 307, workflow status information is generated from the data corresponding to the pertinent workflow within the workflow log database 205. Additionally, a template (e.g., graph, table, diagram, etc.) is generated or selected from a library of templates, as in step 309; the particular template can depend on the type of workflow and corresponding activities. In step 311, presentation data is created by combining the template and the workflow status data. The presentation data, which may include, for example, historical data presented in a hierarchical data structure or current status of the workflow process presented in a diagram, is then made available to the user for display using a graphical user interface (GUI) 111, per step 313.

The display of the presentation data within a browser eliminates the need for users to install "special" software on their computing devices. Traditionally, a client machine required specific software installed thereon; such software package is vendor-specific and implementation dependent. In other words, a vendor would be provided with certain specifications regarding the user's system and the specific job the user wishes to be performed, and the vendor would design particular software specific to that system and to those needs. Furthermore, traditional workflow management systems provide no generic monitor that would enable a user to determine the process history and/or current status of the workflow of a system without depending on a workflow management product from a particular vendor.

By contrast, with the workflow management system 101 of FIG. 1, a user may view operations regarding a particular workflow process by accessing the information through a ubiquitous browser-type application, thereby eliminating the need for any special, vendor-specific and implementation-dependent software packages.

Exemplary GUI screens are next described with respect to FIGS. 4-11. For the purposes of explanation, these screens, which can be displayed by the browser 111, pertain to a service provisioning workflow for the service provider 109.

Figure 4:
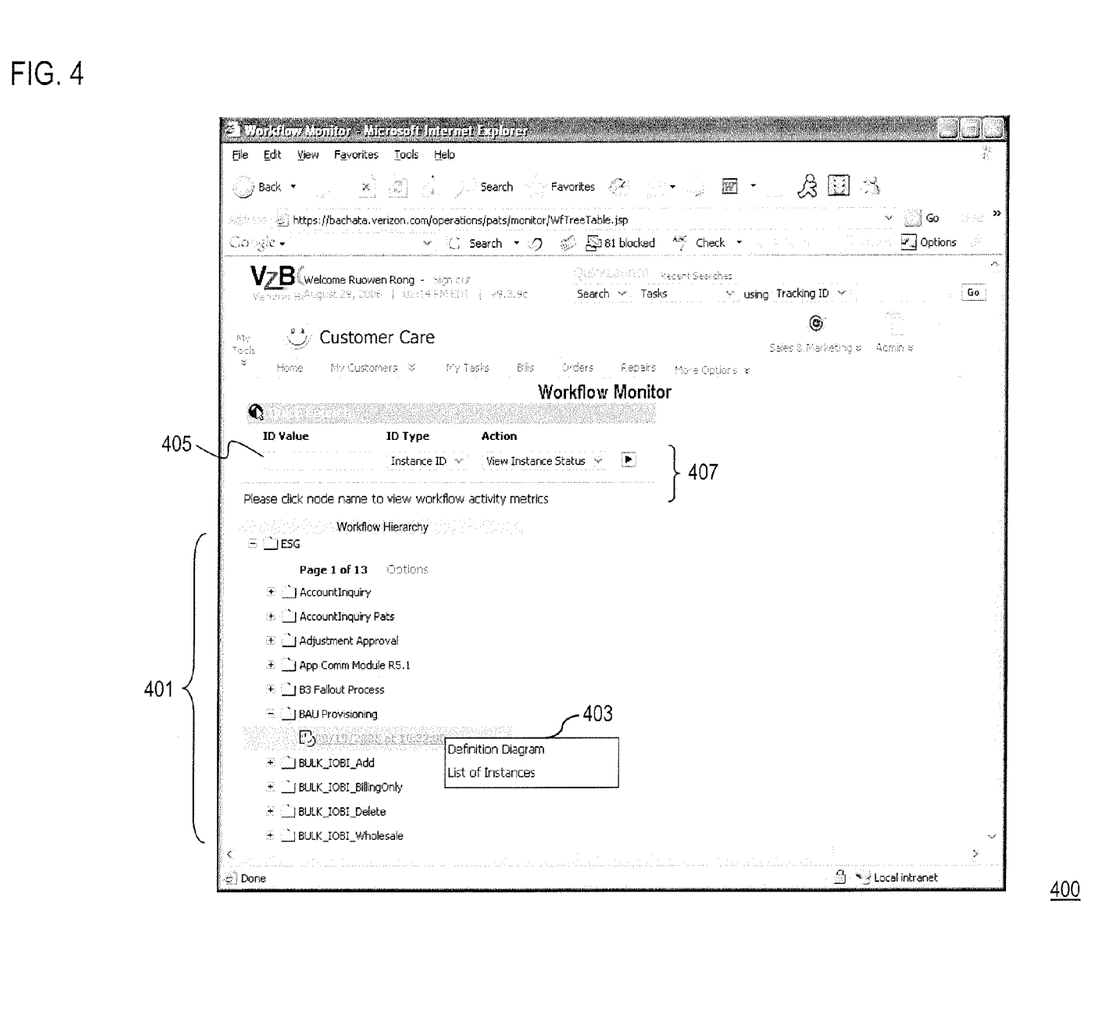
FIG. 4 is a graphical screen of a workflow monitor page, according to an exemplary embodiment.

FIG. 4 is a graphical screen of a workflow monitor page, according to an exemplary embodiment. In this example, a workflow monitor home page 400 displays multi-layer workflows with a hierarchy family tree 401. When a user selects (e.g., right-clicks on) a workflow name, using an input device such as a mouse or other cursor controller, a pop-up menu 403 is presented. The menu 403 in this example lists two choices: "Definition Diagram" and "List of Instances." Any particular instance may also be reached directly from the home page by entering the instance ID (identification) at text box 405 within a Quick Launch bar area 407. When the user clicks on "Definition Diagram," a Definition Diagram of a provisioning workflow, as shown in FIG. 5, is displayed.

Figure 5:
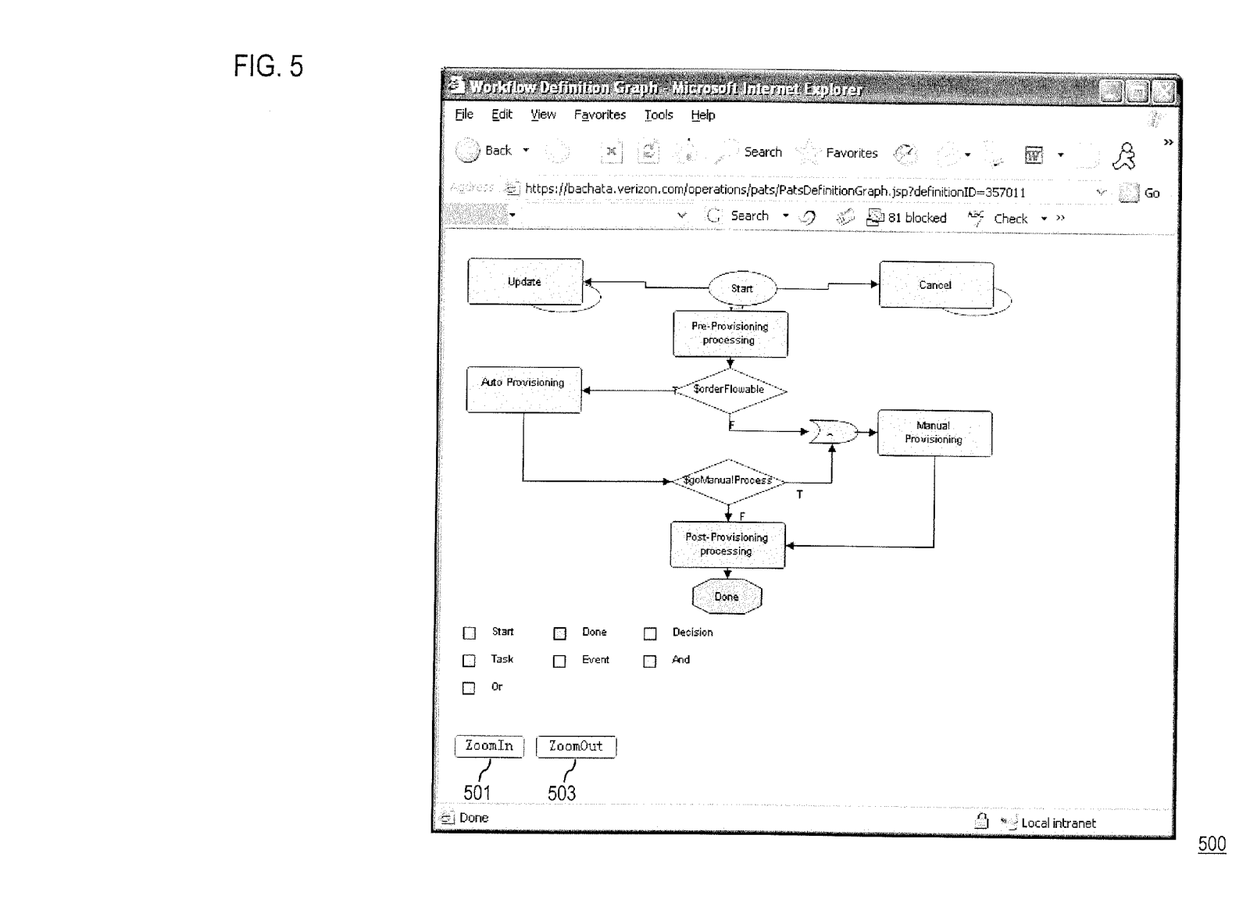
FIGS. 5 and 6 are exemplary graphical workflow definition screens, according to various exemplary embodiments.
Figure 6:
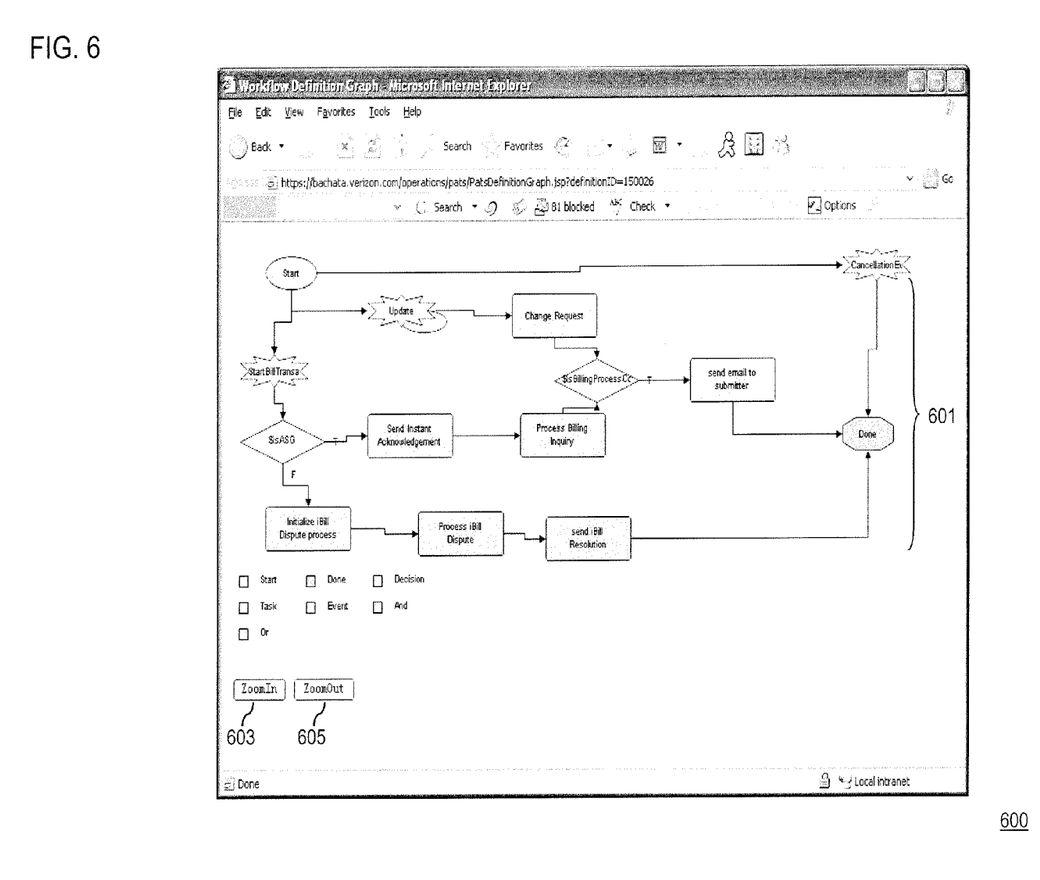

FIGS. 5 and 6 are exemplary graphical workflow definition screens, according to various exemplary embodiments. The Definition Diagram of FIGS. 5 and 6 defines the tasks and events and the interrelationships between them during a workflow process. Each box in the screen 500 of FIG. 5 represents a task or an event. The screen 500 also has the capability for a user to zoom-in, by clicking on button 501, or to zoom-out, by clicking on button 503. This is a useful tool when the diagrams become complicated (i.e., involves many definitional blocks and decision points), with many tasks and events shown thereon. By zooming-in, for example, a user can concentrate on a certain area of the depicted process by magnifying that area. In this way, a user is not distracted by the display of many tasks and/or events which may not be of immediate interest to the user.

FIG. 6 shows a workflow definition for an exemplary billing inquiry screen 600. A graphical representation 601 shows the billing inquiry process using standard flowchart notations. When a billing inquiry is made, the process begins at Start. The process can then proceed in one of three ways. As shown in the inquiry process, the inquiry may be canceled, in which case the process is done, or the inquiry may be updated, in which case a change request is made and a billing process inquiry decision box is entered. If the decision is Yes, or True, meaning the bill has been processed, an e-mail is sent to the submitter of the inquiry, regarding such inquiry and the process is completed. As seen, the billing inquiry may also begin a billing transaction by inquiring as to whether a bill has been paid. If True, an instant acknowledgement of the billing transaction is sent and the billing inquiry is processed and an e-mail to that regard is sent to the submitter of the inquiry. If the answer to the inquiry in the decision box is False, then a bill dispute process is initiated, the bill dispute is processed, and a bill resolution decision ends the process.

As can be appreciated, these flow diagrams for display to the user can become rather large and complicated. Therefore, in order to better view certain portions of the process diagrams, Zoom-in and Zoom-out buttons 603 and 605, respectively, are provided.

While the billing inquiry diagram example of FIG. 6 is relatively simple, certain processes may become very complicated and the need for the zoom-in and zoom-out feature becomes readily apparent. It should be understood that the zoom feature is applicable to both diagram displays of the current status of the workflow process, and historical graphical presentations, e.g., tree-tables, of the workflow process and/or combinations of such diagrams and graphical presentations.

Figure 7:
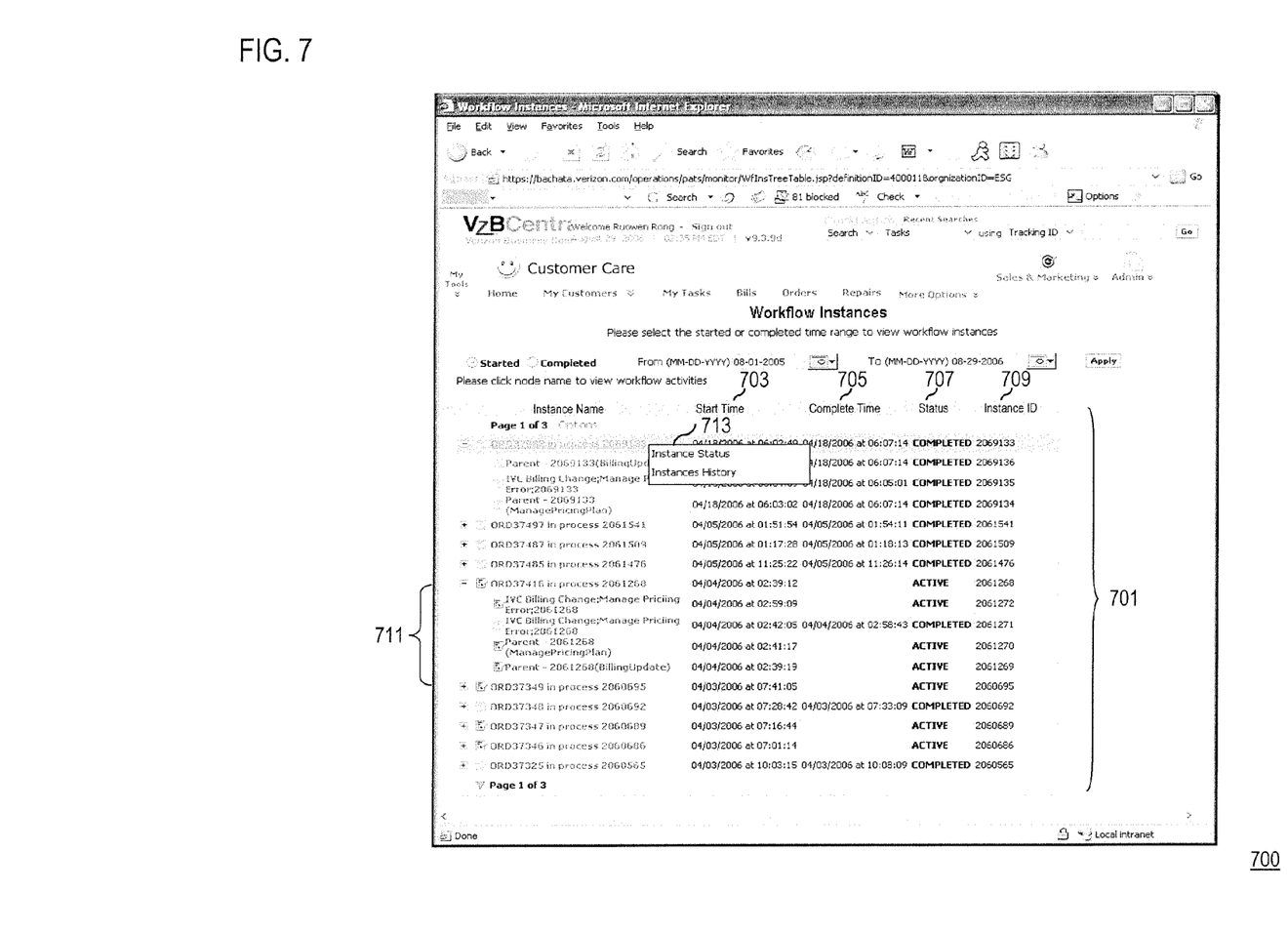
FIG. 7 is a graphical screen showing exemplary workflow instances, according to an exemplary embodiment.

FIG. 7 is a graphical screen showing exemplary workflow instances, according to an exemplary embodiment. In this screen 700, an Instance Tree Table 701 displays each instance of a certain flow, selected from the home page menu. Each of these flow instances has a start time field 703, a complete time field (if the workflow is completed) 705, a current status field 707 and, as well as an instance field 709 (specifying the particular workflow instance). Each flow instance can be expanded, as shown in area 711, into tasks to be performed during the workflow. Tasks are defined in the flow definition, as in FIGS. 6 and 7. Just as in each flow instance, each task also has a start time, current status and complete time (if the workflow is completed). The task may even be an instance of a different flow.

In the example shown in FIG. 7, a user right clicks on an instance and a pop-up menu is displayed. From this pop-up menu, a user may select, at 713, Instance Status or Instance History. Assuming Instance Status is selected, a Workflow Instance Status diagram as in FIG. 8 is displayed.

Figure 8:
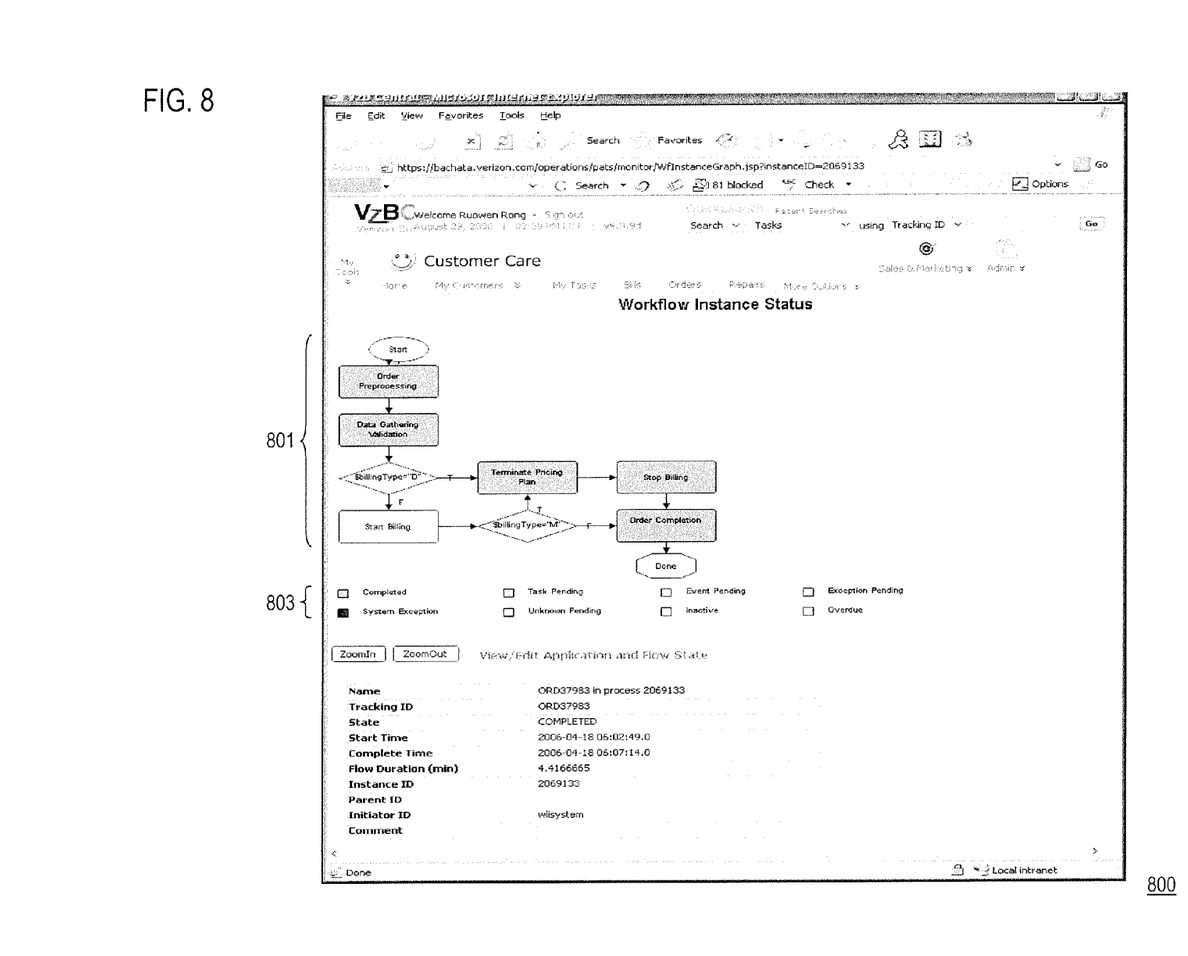
FIGS. 8 and 9 are graphical screens providing status of a workflow instance for a completed flow and an active flow, respectively, according to various exemplary embodiments.
Figure 9:
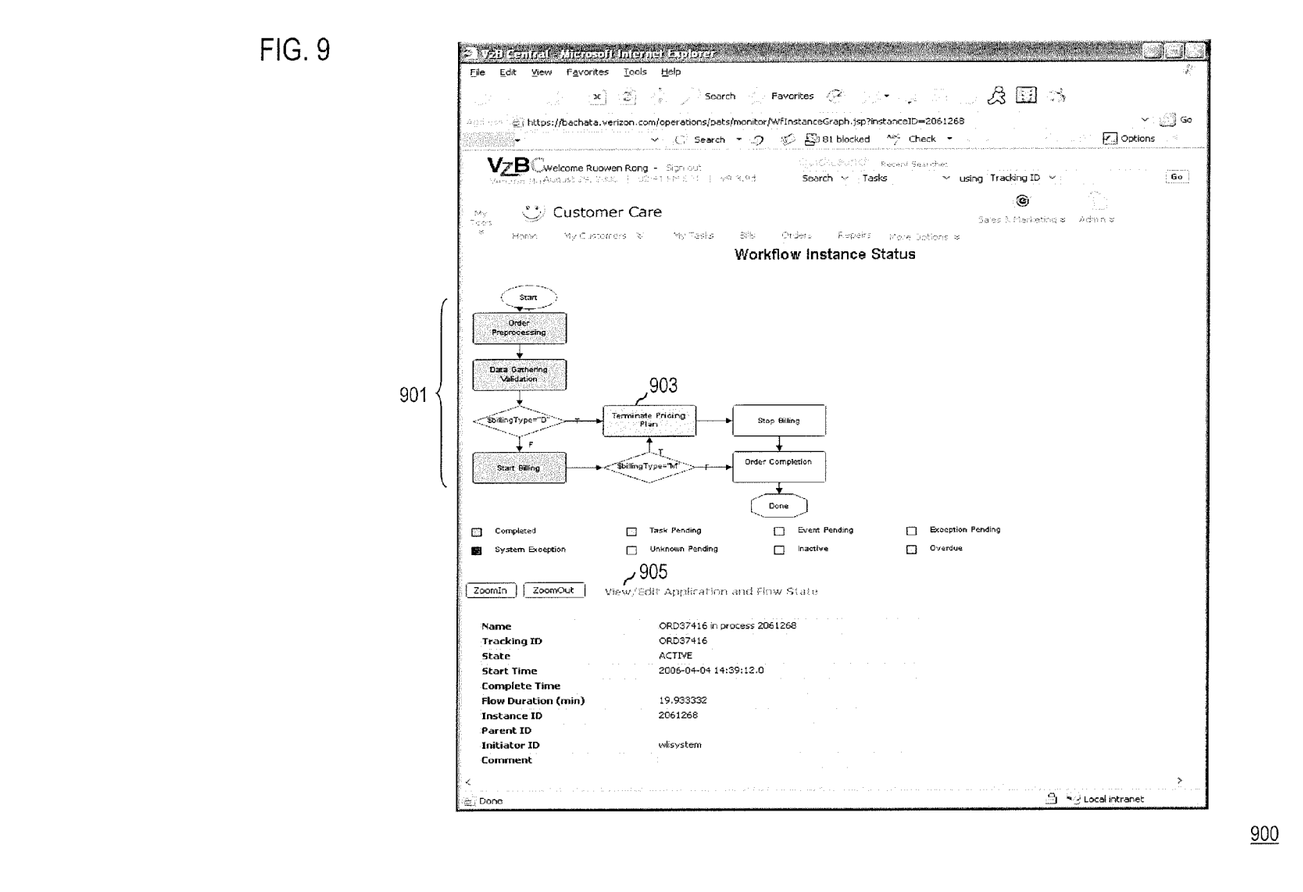

FIGS. 8 and 9 are graphical screens providing status of a workflow instance for a completed flow and an active flow, respectively, according to various exemplary embodiments. The diagram depicted on screen 800 in FIG. 8 displays a complete flow 801, with each task (Order Processing, Data Gathering Validation, Terminate Pricing Plan, Stop Billing, Order Completion) in the workflow in a complete status. The status of a task or event may be color-coded, for example. The color coding key, for example, is shown at 803, with tasks completed shown in a dark shade. Thus, the dark shades of tasks, Order Processing, Data Gathering Validation, Terminate Pricing Plan, Stop Billing, and Order Completion in process 801 indicate tasks completed.

FIG. 9 is another diagram resulting from a user selecting Instance Status from the pop-up menu of FIG. 7, but the flow diagram 901 in screen 900 of FIG. 9 displays an active, rather than a complete flow. The tasks depicted in the dark grey colored boxes have been completed but the tasks in the green colored boxes are pending. Thus, for example, the task "Terminate Pricing Plan" 903 is still pending. It is contemplated that a different pending status is coded in a different color in the diagram 901. The following code, for example, may be employed in order to more efficiently display the diagram of the workflow to a user: Task Pending-green; Event Pending-blue; Exception Pending-yellow; System Exception-red. As shown in FIG. 9, there is a table under the task/event graphic. This table displays current flow parameters. This enables the user to view and edit the application flow state.

Figure 10:
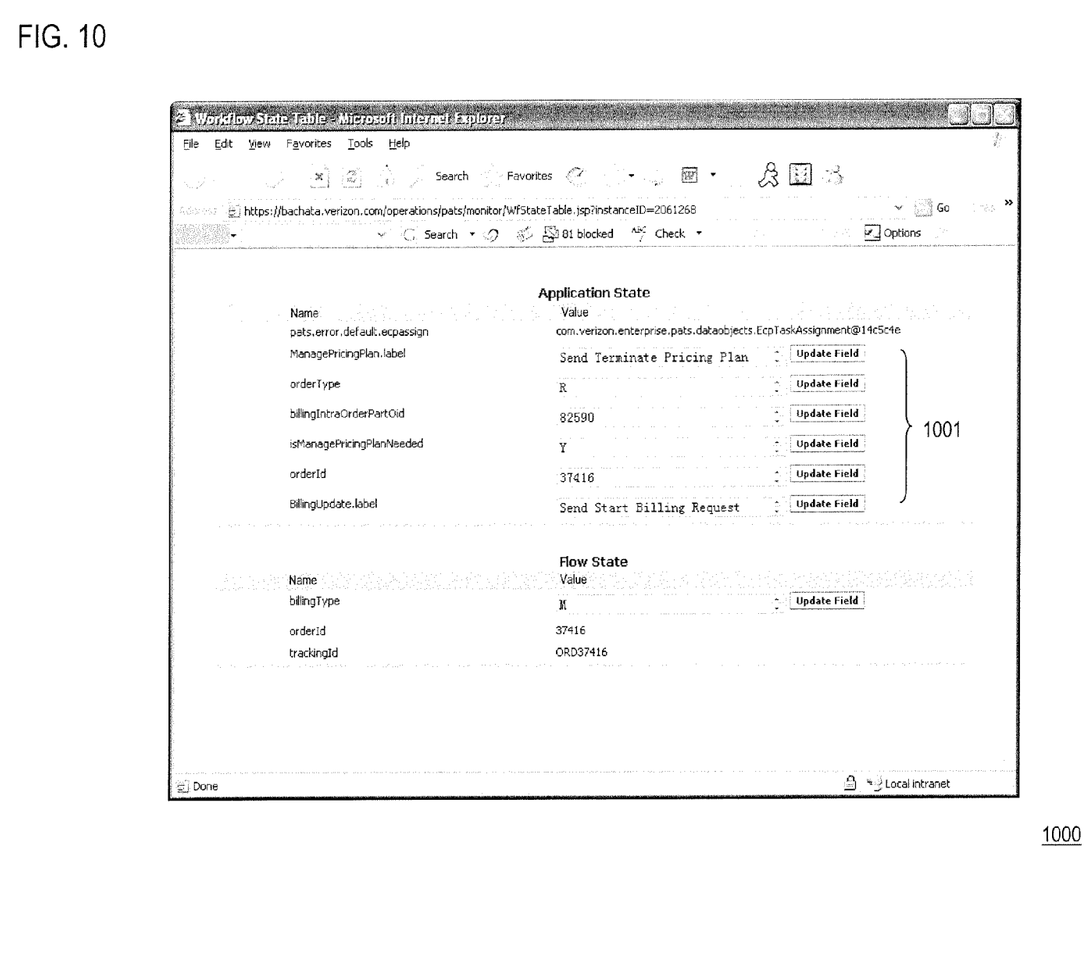
FIG. 10 is a graphical screen providing workflow editing functions, according to an exemplary embodiment.

Should a user click on the "View/Edit Application and Flow State" link 905 shown in FIG. 9, the user is brought to a screen depicted in FIG. 10.

FIG. 10 is a graphical screen providing workflow editing functions, according to an exemplary embodiment. FIG. 10 shows a screen 1000 depicting various application and flow states, with "Update Field" buttons 1001 so that a user may manually update the value of some flow parameters by clicking on the appropriate button. Referring back to FIG. 7 if a user selects the "Instances History" at 713, from the pop-up menu, the user is brought to the screen depicted in FIG. 11.

FIG. 11 is a graphical screen showing workflow instance history, according to an exemplary embodiment. Screen 1100 provides a workflow instance history tree. It is contemplated that the instance history may take other forms of display. The tree table displays the details of every task and event in the workflow. The table also provides for a Messages column 1101 wherein additional information regarding a particular task may be displayed. It is also contemplated that the display may take the form of many different types of graphics, tree-structures, tables, and the like, and/or combinations thereof.

The processes described herein for providing workflow monitoring may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 12:
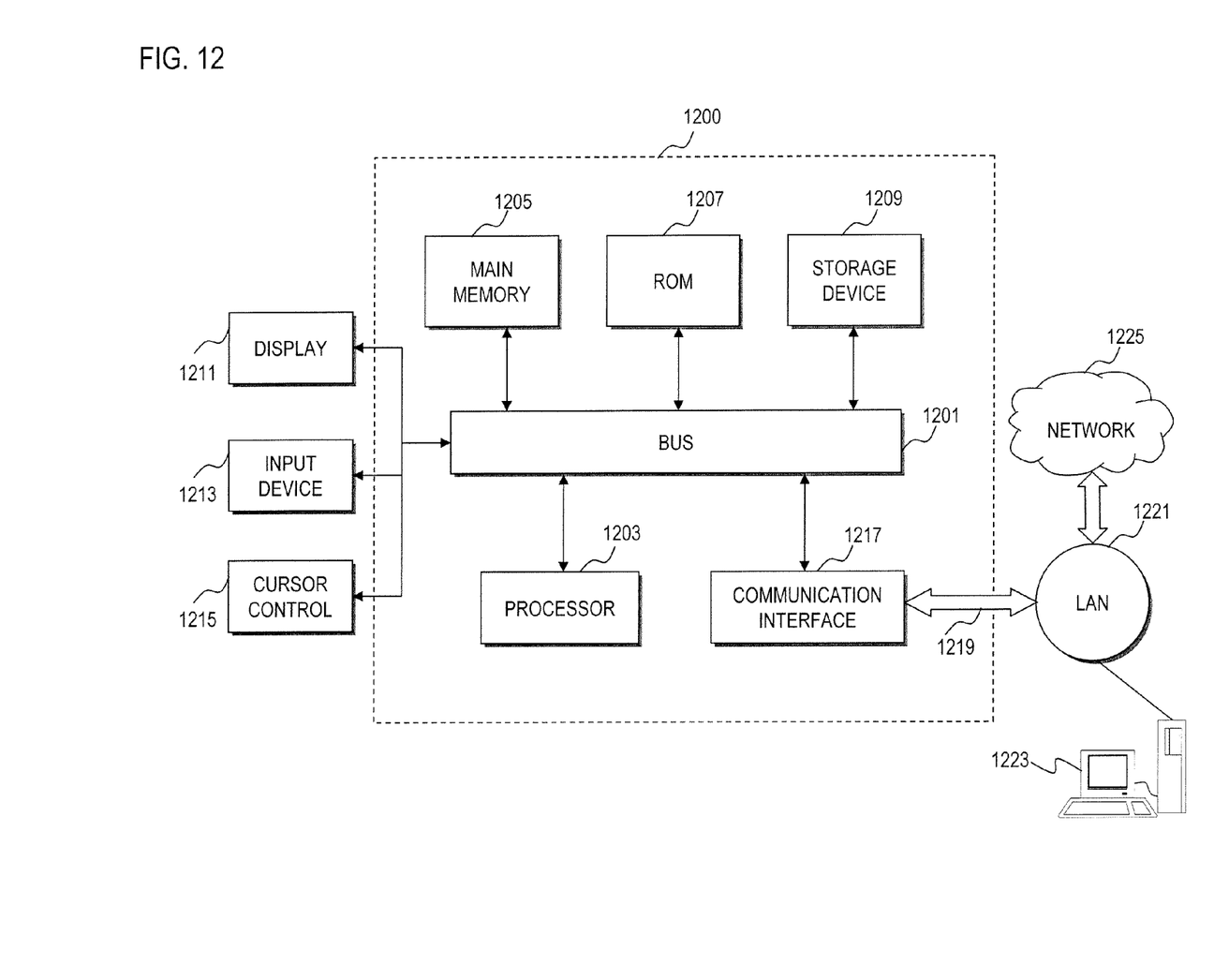
FIG. 12 is a diagram of a computer system that can be used to implement various exemplary embodiments.

FIG. 12 illustrates a computer system 1200 upon which an embodiment according to an exemplary embodiment can be implemented. For example, the processes described herein can be implemented using the computer system 1200. The computer system 1200 includes a bus 1201 or other communication mechanism for communicating information and a processor 1203 coupled to the bus 1201 for processing information. The computer system 1200 also includes main memory 1205, such as a random access memory (RAM) or other dynamic storage device, coupled to the bus 1201 for storing information and instructions to be executed by the processor 1203. Main memory 1205 can also be used for storing temporary variables or other intermediate information during execution of instructions by the processor 1203. The computer system 1200 may further include a read only memory (ROM) 1207 or other static storage device coupled to the bus 1201 for storing static information and instructions for the processor 1203. A storage device 1209, such as a magnetic disk or optical disk, is coupled to the bus 1201 for persistently storing information and instructions.

The computer system 1200 may be coupled via the bus 1201 to a display 1211, such as a cathode ray tube (CRT), liquid crystal display, active matrix display, or plasma display, for displaying information to a computer user. An input device 1213, such as a keyboard including alphanumeric and other keys, is coupled to the bus 1201 for communicating information and command selections to the processor 1203. Another type of user input device is a cursor control 1215, such as a mouse, a trackball, or cursor direction keys, for communicating direction information and command selections to the processor 1203 and for controlling cursor movement on the display 1211.

According to one embodiment contemplated herein, the processes described are performed by the computer system 1200, in response to the processor 1203 executing an arrangement of instructions contained in main memory 1205. Such instructions can be read into main memory 1205 from another computer-readable medium, such as the storage device 1209. Execution of the arrangement of instructions contained in main memory 1205 causes the processor 1203 to perform the process steps described herein. One or more processors in a multi-processing arrangement may also be employed to execute the instructions contained in main memory 1205. In alternative embodiments, hard-wired circuitry may be used in place of or in combination with software instructions to implement certain embodiments. Thus, the exemplary embodiments are not limited to any specific combination of hardware circuitry and software.

The computer system 1200 also includes a communication interface 1217 coupled to bus 1201. The communication interface 1217 provides a two-way data communication coupling to a network link 1219 connected to a local network 1221. For example, the communication interface 1217 may be a digital subscriber line (DSL) card or modem, an integrated services digital network (ISDN) card, a cable modem, a telephone modem, or any other communication interface to provide a data communication connection to a corresponding type of communication line. As another example, communication interface 1217 may be a local area network (LAN) card (e.g. for Ethernet™ or an Asynchronous Transfer Model (ATM) network) to provide a data communication connection to a compatible LAN. Wireless links can also be implemented. In any such implementation, communication interface 1217 sends and receives electrical, electromagnetic, or optical signals that carry digital data streams representing various types of information. Further, the communication interface 1217 can include peripheral interface devices, such as a Universal Serial Bus (USB) interface, a PCMCIA (Personal Computer Memory Card International Association) interface, etc. Although a single communication interface 1217 is depicted in FIG. 12, multiple communication interfaces can also be employed.

The network link 1219 typically provides data communication through one or more networks to other data devices. For example, the network link 1219 may provide a connection through local network 1221 to a host computer 1223, which has connectivity to a network 1225 (e.g. a wide area network (WAN) or the global packet data communication network now commonly referred to as the "Internet") or to data equipment operated by a service provider. The local network 1221 and the network 1225 both use electrical, electromagnetic, or optical signals to convey information and instructions. The signals through the various networks and the signals on the network link 1219 and through the communication interface 1217, which communicate digital data with the computer system 1200, are exemplary forms of carrier waves bearing the information and instructions.

The computer system 1200 can send messages and receive data, including program code, through the network(s), the network link 1219, and the communication interface 1217. In the Internet example, a server (not shown) might transmit requested code belonging to an application program for implementing an exemplary embodiment through the network 1225, the local network 1221 and the communication interface 1217. The processor 1203 may execute the transmitted code while being received and/or store the code in the storage device 1209, or other non-volatile storage for later execution. In this manner, the computer system 1200 may obtain application code in the form of a carrier wave.

The term "computer-readable medium" as used herein refers to any medium that participates in providing instructions to the processor 1203 for execution. Such a medium may take many forms, including but not limited to non-volatile media, volatile media, and transmission media. Non-volatile media include, for example, optical or magnetic disks, such as the storage device 1209. Volatile media include dynamic memory, such as main memory 1205. Transmission media include coaxial cables, copper wire and fiber optics, including the wires that comprise the bus 1201. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out various embodiments may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that flow. The specification and the drawings are accordingly to be regarded in an illustrative rather than restrictive sense.

What is claimed is:

1. A computer-implemented method comprising:
receiving data associated with a workflow including one or more events;
analyzing the data in a computer processor;
creating, in said computer processor, a workflow log based on the analyzed data, wherein the workflow log specifies information about the workflow;
generating a template specifying a format for presenting the workflow log information, and
outputting workflow log information based on the workflow log, wherein the workflow log information is presented, via a browser application and the browser application utilizes the template for display of the workflow log information, wherein a user, via the browser application, can cause workflow processing to temporarily halt and manually intervene to cause the performance of a task specified within the workflow.

2. The method as recited in claim 1, further comprising:
maintaining a running status of the event within the workflow log.

3. The method as recited in claim 1, wherein the information includes history of the event.

4. The method as recited in claim 1, wherein the workflow relates to a provisioning process of telecommunication services.

5. A system comprising:
- a workflow engine configured to generate data associated with a workflow including one or more events; and
- a workflow monitor, within a computer processor, coupled to the workflow engine, the workflow monitor being configured to analyze the data and to create a workflow log based on the analyzed data, wherein the workflow log specifies information about the workflow, the workflow monitor being further configured to output workflow log information based on the workflow log and to provide the workflow log information to a browser application, the workflow monitor being further configured to generate a template specifying a format for presenting the workflow log information, the browser application utilizing the template for display of the workflow log information, wherein a user, via the browser application, can cause workflow processing to temporarily halt and manually intervene to cause the performance of a task specified within the workflow.

6. The system as recited in claim 5, further comprising:
- a workflow log database configured to maintain a running status of the event within the workflow log.

7. The system as recited in claim 5, wherein the information includes history of the event.

8. The system as recited in claim 5, wherein the workflow relates to a provisioning process of telecommunication services.

9. A computer-implemented method comprising:
- analyzing, in a computer processor, workflow status and creating a workflow log from data received from a workflow engine;
- storing the workflow log in a database based on the analysis; and
- generating presentation data for forwarding to a browser based on the stored workflow log, wherein the presentation data includes information about the workflow status and a template for formatting the information by the browser for display of the presentation data, wherein an interface to the computer processor is configured to accept a command from a user, via the browser, to temporarily halt and perform a task specified within the workflow, wherein a user, via the browser application, can cause workflow processing to temporarily halt and manually intervene to cause the performance of a task specified within the workflow.

10. The computer-implemented method according to claim 9, wherein the template is either a tree-table data structure graphic or a flowchart graphic.

11. The computer-implemented method according to claim 10, wherein the flowchart is provided with a zoom function to enable a user to zoom-in and zoom-out on different portions of the flowchart graphic.

12. A workflow monitoring apparatus comprising:
- a processor comprising logic configured to analyze workflow status and to create a workflow log from data received from a workflow engine;
- a workflow log database configured to store the workflow log based on the analysis;
- a workflow log interface configured to retrieve data from the workflow log database;
- a workflow engine interface configured to communicate with the workflow log interface; and
- a presentation interface configured to receive data from the workflow log interface and data from the workflow engine interface, and to present presentation data to a browser, wherein the data from the workflow log interface is indicative of workflow status and the data from the workflow engine interface is indicative of a template, the template being utilized by the browser for display of the presentation data, wherein a user, via the browser application, can cause workflow processing to temporarily halt and manually intervene to cause the performance of a task specified within the workflow.

13. The apparatus according to claim 12, wherein the template is either a tree-table data structure graphic or a flowchart graphic.

14. The apparatus according to claim 13, wherein the flowchart is provided with a zoom function to enable a user to zoom-in and zoom-out on different portions of the flowchart graphic.

* * * * *